United States Patent
Imamura et al.

(10) Patent No.: US 9,645,403 B2
(45) Date of Patent: May 9, 2017

(54) REFLECTIVE IMAGING ELEMENT AND OPTICAL SYSTEM

(71) Applicant: Sharp Kabushiki Kaisha, Osaka-shi, Osaka (JP)

(72) Inventors: Kentarou Imamura, Osaka (JP); Takahumi Shimatani, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 109 days.

(21) Appl. No.: 14/378,149

(22) PCT Filed: Feb. 13, 2013

(86) PCT No.: PCT/JP2013/053358
§ 371 (c)(1),
(2) Date: Aug. 12, 2014

(87) PCT Pub. No.: WO2013/122085
PCT Pub. Date: Aug. 22, 2013

(65) Prior Publication Data
US 2015/0029585 A1    Jan. 29, 2015

(30) Foreign Application Priority Data
Feb. 14, 2012   (JP) ................................ 2012-029208

(51) Int. Cl.
*G03B 21/60* (2014.01)
*G02B 27/22* (2006.01)
(Continued)

(52) U.S. Cl.
CPC ....... *G02B 27/2292* (2013.01); *G02B 5/0816* (2013.01); *G02B 5/09* (2013.01); *G02B 17/006* (2013.01); *G02B 17/008* (2013.01)

(58) Field of Classification Search
CPC ... G02B 27/2294; G02B 5/0816; G02B 5/124
(Continued)

(56) References Cited

U.S. PATENT DOCUMENTS

| | | | |
|---|---|---|---|
| 2009/0310231 A1 | 12/2009 | Maekawa | |
| 2010/0073751 A1 | 3/2010 | Maekawa | |
| 2011/0181949 A1* | 7/2011 | Hashikawa | G02B 17/006 |
| | | | 359/463 |

FOREIGN PATENT DOCUMENTS

| | | | |
|---|---|---|---|
| JP | 09005503 A | * | 1/1997 |
| JP | 2008-158114 A | | 7/2008 |

(Continued)

OTHER PUBLICATIONS

International Search Report PCT/ISA/210 for International Application No. PCT/JP2013/053358 Dated May 14, 2013.

*Primary Examiner* — Audrey Y Chang
(74) *Attorney, Agent, or Firm* — Harness, Dickey & Pierce, P.L.C.

(57) ABSTRACT

A reflective imaging element that may be manufactured in a convenient method and obtain a high quality aerial picture is provided. A reflective imaging element of an embodiment includes a first reflective element and a second reflective element including a light receiving surface to receive light from a projected material and an emitting surface, parallel to the light receiving surface, to emit the light from the projected material. When a ratio of light contributing to imaging out of the light from the projected material is defined as a ratio of amount of light and an incident angle of the light from the projected material when the ratio of amount of light is highest to the light receiving surface is defined as a maximum incident angle, the maximum incident angle of the first reflective element and the maximum incident angle of the second reflective element are different from each other.

6 Claims, 6 Drawing Sheets

(51) Int. Cl.
*G02B 17/00* (2006.01)
*G02B 5/08* (2006.01)
*G02B 5/09* (2006.01)

(58) Field of Classification Search
USPC ............... 359/479, 449, 459, 726, 624, 546;
362/325; 353/10, 71; 345/32
See application file for complete search history.

(56) References Cited

FOREIGN PATENT DOCUMENTS

| | | |
|---|---|---|
| WO | WO-2008/111426 A1 | 9/2008 |
| WO | WO-2009131128 A1 | 10/2009 |
| WO | WO-2009136578 A1 | 11/2009 |

\* cited by examiner (a)

(b)

(c)

(a)

(b)

(a)

(b)

(c)

REFLECTIVE IMAGING ELEMENT AND OPTICAL SYSTEM

TECHNICAL FIELD

The present invention relates to a reflective imaging element capable of imaging an image of a projected material in a space and an optical system having the reflective imaging element.

BACKGROUND ART

Recently, optical systems to image a projected material in a space using a reflective imaging element are proposed (for example, PTLs 1 through 3). The optical system has a reflective imaging element and a projected material, and the image displayed in a space (hereinafter, referred to as "aerial picture") is an image of the projected material imaged in a plane symmetric position with the reflective imaging element as a plane of symmetry. Such optical system utilizes specular reflection of the reflective imaging element, and in principle, a ratio in size of the image of the projected material to the image appeared in the space is 1:1.

As the reflective imaging element, one provided with holes penetrating through a substrate in a flat plate shape in a thickness direction and having an optical element configured with two mirror elements (also referred to as "unit imaging elements") perpendicular to an inner wall of each hole (for example, refer to FIG. 4 in PTL 1), or one having an optical element provided with a plurality of transparent tubular bodies projected in a direction of a thickness of a substrate and configured with two mirror elements perpendicular to an inner wall surface of each tubular body is disclosed (for example, refer to FIG. 7 in PTL 1).

The reflective imaging elements disclosed in PTLs 1 and 2 have a substrate with a thickness from 50 µm to 200 µm having from several tens of thousands to several hundreds of thousands of square holes of approximately 50 µm to 200 µm on a side formed therein and an inner surface of each hole is subjected to mirror coating by electrocasting, nanoprinting, or sputtering. In particular, PTL 2 discloses a reflective imaging element allowing observation of an aerial picture by many people from various directions.

A reflective imaging element disclosed in PTL 3 has a reflective imaging element with a continuously varying thickness to make a wedge shape, thereby widening a viewing angle of an aerial picture.

For reference, contents of disclosure in PTLs 1 and 2 are incorporated herein in its entirety.

CITATION LIST

Patent Literature

PTL 1: Japanese Unexamined Patent Application Publication No. 2008-158114
PTL 2: International Publication No. WO2008/111426
PTL 3: International Publication No. WO2009/136578

SUMMARY OF INVENTION

Technical Problem

However, whereas the reflective imaging element disclosed in PTL 3 is formed by laminating a glass substrate having a mirror element formed therein, followed by cutting with a wire saw or the like, it is extremely difficult, due to production, to cut while varying the thickness. In addition, while the cut surface is polished after cutting, it is also very difficult to mirror polish the reflective imaging element in a wedge shape.

The present invention has been made in view of the above problems, and it is a major object to provide a reflective imaging element that may be manufactured in a convenient method and obtain an aerial picture with a wide viewing angle.

Solution to Problem

A reflective imaging element in an embodiment according to the present invention includes a first reflective element and a second reflective element having a light receiving surface that receives light from a projected material and an emitting surface that is parallel to the light receiving surface and emits the light from the projected material, wherein the first reflective element images the light from the projected material in a plane symmetric position with the first reflective element as a plane of symmetry, the second reflective element images the light from the projected material in a plane symmetric position with the second reflective element as a plane of symmetry, and when a ratio of light contributing to imaging out of the light from the projected material is defined as a ratio of amount of light and an incident angle of the light from the projected material when the ratio of amount of light is highest to the light receiving surface is defined as a maximum incident angle, the maximum incident angle of the first reflective element and the maximum incident angle of the second reflective element are different from each other.

In an embodiment, the first reflective element has a first unit reflective element and a second unit reflective element that is disposed on the first unit reflective element; the first unit reflective element has a plurality of first mirror elements and a plurality of first light-transmitting elements, each of the plurality of first light-transmitting elements is equipped between two adjacent first mirror elements out of the plurality of first mirror elements, and the plurality of first mirror elements and the plurality of first light-transmitting elements extend in a first direction; the second unit reflective element has a plurality of second mirror elements and a plurality of second light-transmitting elements, each of the plurality of second light-transmitting elements is equipped between two adjacent second mirror elements out of the plurality of second mirror elements, and the plurality of second mirror elements and the plurality of second light-transmitting elements extend in a second direction that is perpendicular to the first direction; the second reflective element has a third unit reflective element and a fourth unit reflective element that is disposed on the third unit reflective element; the third unit reflective element has a plurality of third mirror elements and a plurality of third light-transmitting elements, each of the plurality of third light-transmitting elements is equipped between two adjacent third mirror elements out of the plurality of third mirror elements, and the plurality of third mirror elements and the plurality of third light-transmitting elements extend in the first direction; and the fourth unit reflective element has a plurality of fourth mirror elements and a plurality of fourth light-transmitting elements, each of the plurality of fourth light-transmitting elements is equipped between two adjacent fourth mirror elements out of the plurality of fourth mirror elements, and the plurality of fourth mirror elements and the plurality of fourth light-transmitting elements extend in the second direction.

In an embodiment, a thickness of the first reflective element and a thickness of the second reflective element are different from each other.

In an embodiment, respective refractive indices of at least either one of the plurality of first light-transmitting elements and the plurality of second light-transmitting elements are different from respective refractive indices of at least either one of the plurality of third light-transmitting elements and the plurality of fourth light-transmitting elements.

In an embodiment, at least either one of respective lengths of the plurality of first mirror elements in a thickness direction of the first unit reflective element and respective lengths of the plurality of second mirror elements in a thickness direction of the second unit reflective element are different from at least either one of respective lengths of the plurality of third mirror elements in a thickness direction of the third unit reflective element and respective lengths of the plurality of fourth mirror elements in a thickness direction of the fourth unit reflective element.

An optical system in an embodiment according to the present invention includes the reflective imaging element described above and a display panel that is disposed on a light incident side of the reflective imaging element, the optical system imaging a picture displayed on a display surface of the display panel in a plane symmetric position with the reflective imaging element as a plane of symmetry, wherein the first reflective element is positioned on a side of the display panel closer than the second reflective element, and a thickness of the first reflective element is greater than a thickness of the second reflective element.

In an embodiment, respective refractive indices of at least either one of the plurality of first light-transmitting elements and the plurality of second light-transmitting elements are greater than respective refractive indices of at least either one of the plurality of third light-transmitting elements and the plurality of fourth light-transmitting elements.

In an embodiment, at least either one of respective lengths of the plurality of first mirror elements in a thickness direction of the first unit reflective element and respective lengths of the plurality of second mirror elements in a thickness direction of the second unit reflective element is greater than at least either one of respective lengths of the plurality of third mirror elements in a thickness direction of the third unit reflective element and respective lengths of the plurality of fourth mirror elements in a thickness direction of the fourth unit reflective element.

An optical system in another embodiment according to the present invention includes the reflective imaging element described above and a display panel that is disposed on a light incident side of the reflective imaging element, the optical system imaging a picture displayed on a display surface of the display panel in a plane symmetric position with the reflective imaging element as a plane of symmetry, wherein the first reflective element is positioned on a side of the display panel closer than the second reflective element, and respective refractive indices of at least either one of the plurality of first light-transmitting elements and the plurality of second light-transmitting elements are greater than respective refractive indices of at least either one of the plurality of third light-transmitting elements and the plurality of fourth light-transmitting elements.

An optical system in still another embodiment according to the present invention includes the reflective imaging element described above and a display panel that is disposed on a light incident side of the reflective imaging element, the optical system imaging a picture displayed on a display surface of the display panel in a plane symmetric position with the reflective imaging element as a plane of symmetry, wherein the first reflective element is positioned on a side of the display panel closer than the second reflective element, and at least either one of the respective lengths of the plurality of first mirror elements in the thickness direction of the first unit reflective element and the respective lengths of the plurality of second mirror elements in the thickness direction of the second unit reflective element is greater than at least either one of the respective lengths of the plurality of third mirror elements in the thickness direction of the third unit reflective element and the respective lengths of the plurality of fourth mirror elements in the thickness direction of the fourth unit reflective element.

Advantageous Effects of Invention

According to the present invention, a reflective imaging element that may be manufactured in a convenient method and obtain an aerial picture with a wide viewing angle is provided.

DESCRIPTION OF EMBODIMENTS

Although embodiments of the present invention are described below with reference to the drawings, the present invention is not limited to the exemplification embodiments.

Figure 1:
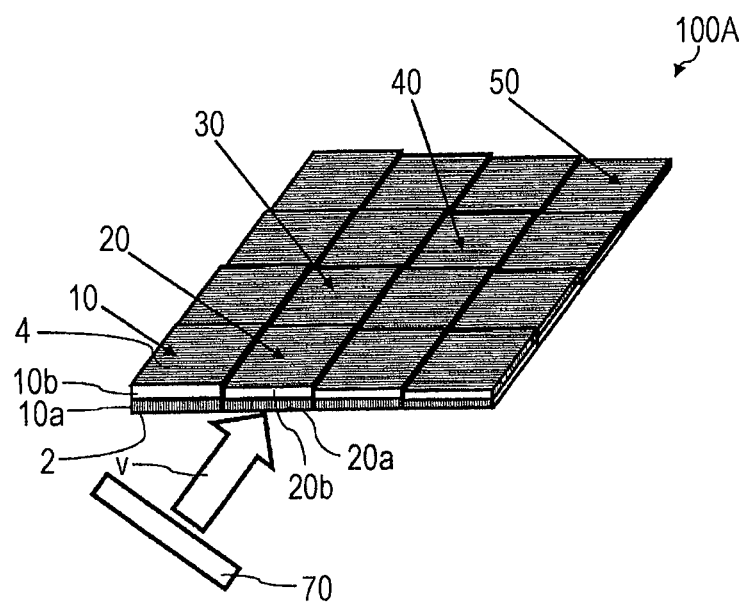
FIG. 1(a) is a schematic perspective view of a reflective imaging element 100A in an embodiment according to the present invention.
FIG. 1(b) is a schematic perspective view of reflective elements 10 and 20.
FIG. 1(c) is a schematic perspective view illustrating mirror elements 14a through 14d and light-transmitting elements 15a through 15d.
Figure 1:
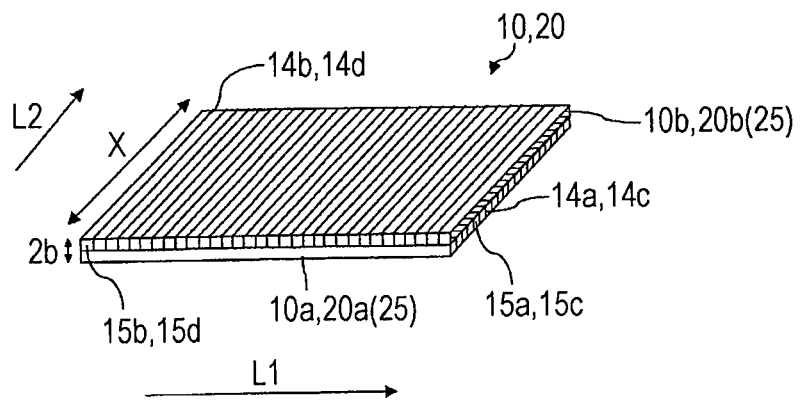
Figure 1:
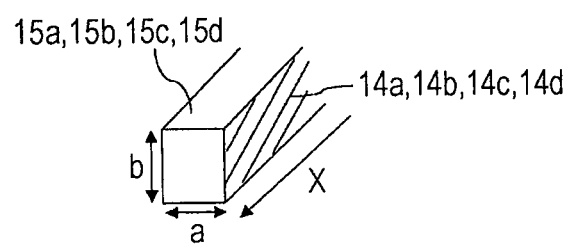

With reference to FIG. 1, descriptions are given to a reflective imaging element 100A in an embodiment according to the present invention. FIG. 1(a) is a schematic perspective view of the reflective imaging element 100A. FIG. 1(b) is a perspective view illustrating reflective elements 10 through 50. FIG. 1(c) is a schematic perspective view illustrating mirror elements 14a through 14d and light-transmitting elements 15a through 15d. The reference character v illustrated in FIG. 1(a) denotes light from a display panel (for example, a liquid crystal display panel) 70.

The reflective imaging element 100A illustrated in FIG. 1(a) is provided with a reflective element 10 and a reflective element 20 having a light receiving surface 2 that receives light from a projected material 70 and an emitting surface 4 that is parallel to the light receiving surface 2 and emits the light from the projected material 70. The reflective element 10 images the light from the projected material 70 in a plane symmetric position with the reflective element 10 as a plane of symmetry. The reflective element 20 images the light from the projected material 70 in a plane symmetric position with the reflective element 20 as a plane of symmetry. When a ratio of light contributing to imaging out of the light from the projected material 70 is defined as a ratio of amount of light and an incident angle of the light from the projected material 70 at a highest ratio of amount of light to the light receiving surface is defined as a maximum incident angle, a maximum incident angle of the reflective element 10 and a maximum incident angle of the reflective element 20 are different from each other. For example, a difference between the maximum incident angle of the reflective element 10 and the maximum incident angle of the reflective element 20 is not more than 40°. The ratio of amount of light and the maximum incident angle are described later.

Although details are described later, the reflective imaging element 100A having such structure may be manufactured in a convenient method and obtain an aerial picture with a wide viewing angle.

Further, as illustrated in FIG. 1(b) and FIG. 1(c), the reflective element 10 has a first unit reflective element 10a and a second unit reflective element 10b disposed on the first unit reflective element 10a.

The first unit reflective element 10a has a plurality of first mirror elements 14a and a plurality of first light-transmitting elements 15a, and each of the plurality of first light-transmitting elements 15a is equipped between two adjacent first mirror elements 14a out of the plurality of first mirror elements 14a, and the plurality of first mirror elements 14a and the plurality of first light-transmitting elements 15a extend in a first direction L1.

The second unit reflective element 10b has a plurality of second mirror elements 14b and a plurality of second light-transmitting elements 15b, and each of the plurality of second light-transmitting elements 15b is equipped between two adjacent second mirror elements 14b out of the plurality of second mirror elements 14b, and the plurality of second mirror elements 14b and the plurality of second light-transmitting elements 15b extend in a second direction L2 perpendicular to the first direction L1.

The reflective element 20 has a third unit reflective element 20a and a fourth unit reflective element 20b disposed on the third unit reflective element 20a.

The third unit reflective element 20a has a plurality of third mirror elements 14c and a plurality of third light-transmitting elements 15c, and each of the plurality of third light-transmitting elements 15c is equipped between two adjacent third mirror elements 14c out of the plurality of third mirror elements 14c, and the plurality of third mirror elements 14c and the plurality of third light-transmitting elements 15c extend in the first direction L1.

The fourth unit reflective element 20b has a plurality of fourth mirror elements 14d and a plurality of fourth light-transmitting elements 15d, and each of the plurality of fourth light-transmitting elements 15d is equipped between two adjacent fourth mirror elements 14d out of the plurality of fourth mirror elements 14d, and the plurality of fourth mirror elements 14d and the plurality of fourth light-transmitting elements 15d extend in the second direction L2.

Further, it is preferred that respective refractive indices of at least either one of the plurality of first light-transmitting elements 15a and the plurality of second light-transmitting elements 15b are different from respective refractive indices of at least either one of the plurality of third light-transmitting elements 15c and the plurality of fourth light-transmitting elements 15d. Further, it is more preferred that respective refractive indices of the plurality of first light-transmitting elements 15a and the plurality of second light-transmitting elements 15b are different from respective refractive indices of the plurality of third light-transmitting elements 15c and the plurality of fourth light-transmitting elements 15d.

Next, detailed descriptions are given to the reflective imaging element 100A.

As illustrated in FIG. 1(a) through FIG. 1(c), the reflective imaging element 100A is formed by combining (may also be referred to as "tiling") the reflective elements 10 through 50 including a first reflective element 10 and a second reflective element 20.

The reflective elements 10 through 50 are different only in thicknesses of the reflective elements 10 through 50 from each other, respectively. The reflective imaging element 100A has one reflective element 10, two reflective elements 20, seven reflective elements 30, three reflective elements 40, and three reflective elements 50. When configuring an optical system using the display panel 70 and the reflective imaging element 100A, it is preferred that the reflective imaging element 100A is configured by tiling each of reflective elements 10 through 50 so as to increase thicknesses of the reflective elements 10 through 50 as getting close to the display panel 70 side. This is because an aerial picture with a wider viewing angle is obtained. In the reflective imaging element 100A illustrated in FIG. 1(a), the thicknesses of the reflective elements 10 through 50 increase roughly as going from the right rear corner to the left front corner of the drawing. The thickness of the reflective element 10 is, for example, 1100 μm. The thickness of the reflective elements 20 is, for example, 1000 μm. The thickness of the reflective elements 30 is, for example, 900 μm. The thickness of the reflective elements 40 is, for example, 800 μm. The thickness of the reflective elements 50 is, for example, 700 μm. That is, the thicknesses decrease in the order of the reflective imaging element 10, reflective imaging elements 20, reflective imaging elements 30, reflective imaging elements 40, and reflective imaging elements 50.

As illustrated in FIG. 1(c), each of the plurality of light-transmitting elements 15a through 15d has, for example, a rectangular parallelepiped shape and is formed from, for example, a glass material. On respective one surface of the plurality of light-transmitting elements 15a through 15d, the mirror elements 14a through 14d are formed. The mirror elements 14a through 14d are formed from, for example, aluminum (Al). As illustrated in FIG. 1(b), in each of the unit reflective elements 10a, 10b, 20a, and 20b (hereinafter, referred to as unit reflective elements 25), the mirror elements 14a through 14d and the light-transmitting elements 15a through 15d are arranged alternately in stripes.

Each of the light-transmitting elements 15a through 15d has a width a, a thickness b, and a length X. The width a is, for example, not less than 50 μm and not more than 1500 μm. As the width a decreases, the aerial picture is enhanced in resolution. The thickness b is, for example, not less than 150

μm and not more than 10000 μm. The thickness b influences the ratio of amount of light described later, and it is preferred to be set so as to obtain a high ratio of amount of light. The width a and the thickness b satisfy the relationship of b>a. The length X may be appropriately determined depending on the application to be used. In the reflective imaging element 100A, the width a is 300 μm, and refractive indices n of all light-transmitting elements including the light-transmitting elements 15a through 15d are, for example, 1.5, respectively. The thickness b is set so as to be the thickness of each of reflective elements 10 through 50 described above.

Figure 2:
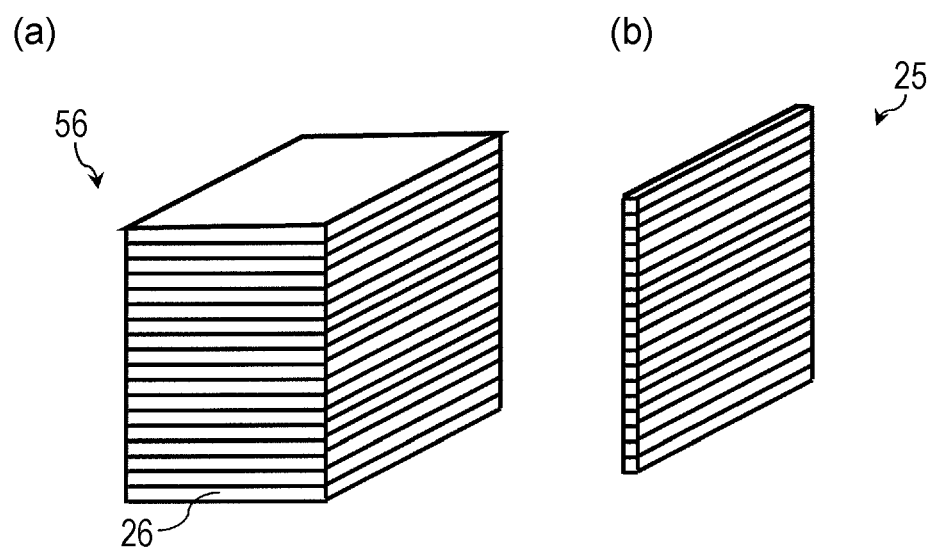
FIGS. 2(a) and 2(b) are schematic perspective views illustrating a method of manufacturing a unit reflective element 25.

Next, with reference to FIG. 2, descriptions are given to a method of manufacturing the unit reflective element 25. FIG. 2(a) and FIG. 2(b) are schematic perspective views to illustrate a method of manufacturing the unit reflective element 25.

Firstly, on a light-transmitting substrate (for example, a glass substrate) 26, a metal thin film (for example, an aluminum thin film) to be the mirror elements 14a through 14d described above is formed by sputtering, for example, or the like. A thickness of the metal thin film is, for example, 200 nm. With the substrate 26 having such metal thin film formed thereon, layers of the substrates 26 are stacked so as to sandwich the metal thin film between the light-transmitting substrates 26 to form a laminated structure 56 as illustrated in FIG. 2(a).

Next, as illustrated in FIG. 2(b), the laminated structure 56 is cut using a wire saw or the like from a direction vertical to the surface having the metal thin film formed thereon of the light-transmitting substrate 26 to form the unit reflective element 25. The thickness b of the unit reflective element 25 is determined by a cutting pitch at this time, and the unit reflective element 25 having a desired thickness is easily obtained.

By combining the unit reflective elements 25 having different thickness from each other, the reflective imaging element 100A is obtained. Accordingly, not having to cut in a wedge shape as the reflective imaging element disclosed in PTL 3, the reflective imaging element 100A may be manufactured in a convenient method.

Figure 3:
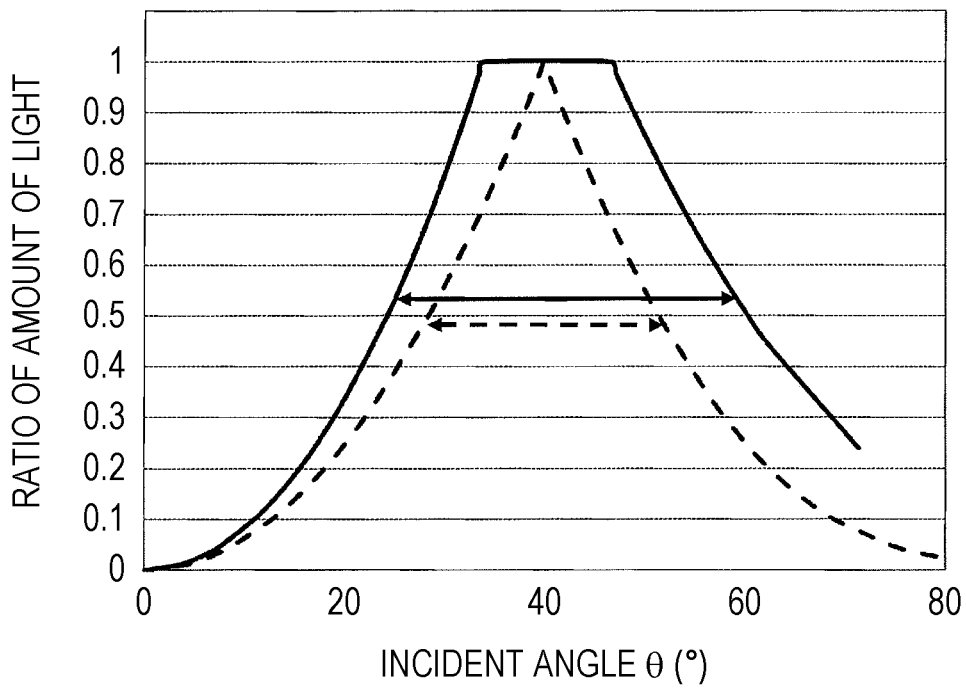
FIG. 3(a) is a graph illustrating respective relationship between an incident angle θ and a ratio of amount of light of the reflective imaging element 100A and a reflective imaging element of a comparison.
FIG. 3(b) is a graph illustrating relationship between an incident angle θ and a ratio of amount of light of each of reflective elements 10 through 50.
Figure 3:
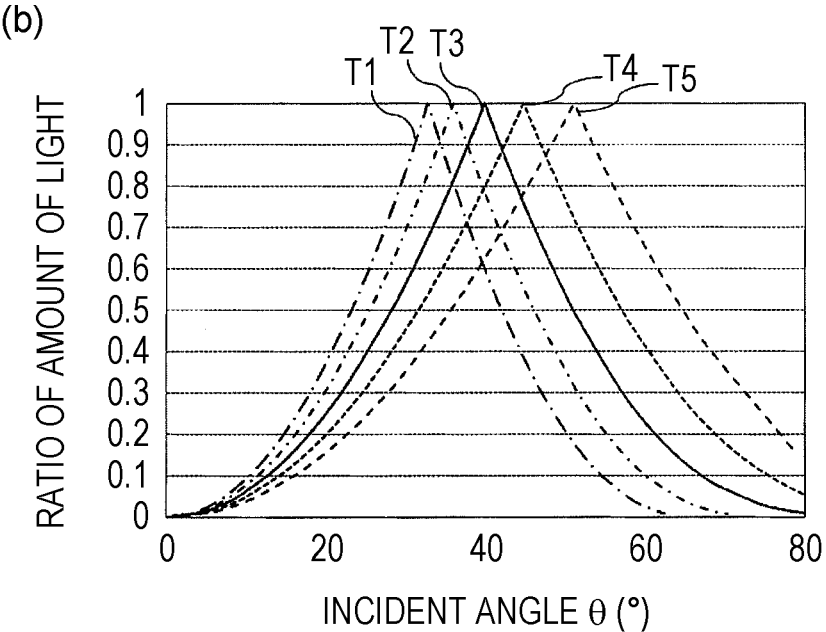

Next, with reference to FIG. 3, descriptions are given to optical properties of the reflective imaging element 100A. FIG. 3(a) is a graph illustrating relationship between the ratio of amount of light and the incident angle θ in optical systems respectively using a reflective imaging element of a comparison and the reflective imaging element 100A. A broken line in the graph is a graph illustrating relationship between the ratio of amount of light and the incident angle θ in an optical system using a reflective imaging element of a comparison. The reflective imaging element of a comparison is a reflective imaging element having a uniform thickness over the entire surface. A solid line in the graph is a graph illustrating relationship between the ratio of amount of light and the incident angle θ in an optical system when further increasing the reflective elements having different thicknesses that form the reflective imaging element 100A. The incident angle θ is an incident angle of light from a projected material (for example, a display panel) to each reflective imaging element. The ratio of amount of light is a ratio of aerially imaged light out of light from the projected material. Accordingly, as the ratio of amount of light is closer to 1, the light from the projected material is imaged efficiently and visibility of the aerial picture thus obtained is high. When the ratio of amount of light is not less than 0.5, the visibility of the aerial picture thus obtained is good.

As seen from FIG. 3(a), in the reflective imaging element of a comparison, the incident angle θ for a ratio of amount of light of not less than 0.5 is roughly not less than 10° and not more than 45°. Meanwhile, in the reflective imaging element 100A, the incident angle θ for a ratio of amount of light of not less than 0.5 is not less than 10° and not more than 65°.

A viewing angle of an aerial picture obtained in an optical system using a reflective imaging element is determined by the incident angle θ. Accordingly, as a range of the incident angle θ to obtain an aerial picture of high visibility is wider, the viewing angle of the aerial picture becomes greater, so that when the reflective imaging element 100A is used, the viewing angle of the aerial picture thus obtained becomes greater.

Next, with reference to FIG. 3(b), descriptions are given to optical properties of the respective reflective elements 10 through 50 that the reflective imaging element 100A has. FIG. 3(b) is a graph illustrating relationship between the incident angle θ and the ratio of amount of light in each of the reflective elements 10 through 50. A line T1 is a graph representing relationship between the incident angle θ and the ratio of amount of light of the reflective element 10. A line T2 is a graph representing relationship between the incident angle θ and the ratio of amount of light of the reflective element 20. A line T3 is a graph representing relationship between the incident angle θ and the ratio of amount of light of the reflective element 30. A line T4 is a graph representing relationship between the incident angle θ and the ratio of amount of light of the reflective element 40. A line T5 is a graph representing relationship between the incident angle θ and the ratio of amount of light of the reflective element 50.

As seen from FIG. 3(b), the incident angle (maximum incident angle) when the ratio of amount of light of each of reflective elements 10 through 50 is maximum (when the ratio of amount of light is 1) is different from each other, respectively. Specifically, the maximum incident angle of the reflective element 10 is 33°, the maximum incident angle of the reflective element 20 is 36°, the maximum incident angle of the reflective element 30 is 40°, the maximum incident angle of the reflective element 40 is 45°, and the maximum incident angle of the reflective element 50 is 51°.

In such a manner, the reflective imaging element 100A has the reflective elements 10 through 50 with respective maximum incident angles different from each other to achieve a wider viewing angle of an aerial picture.

Figure 4:
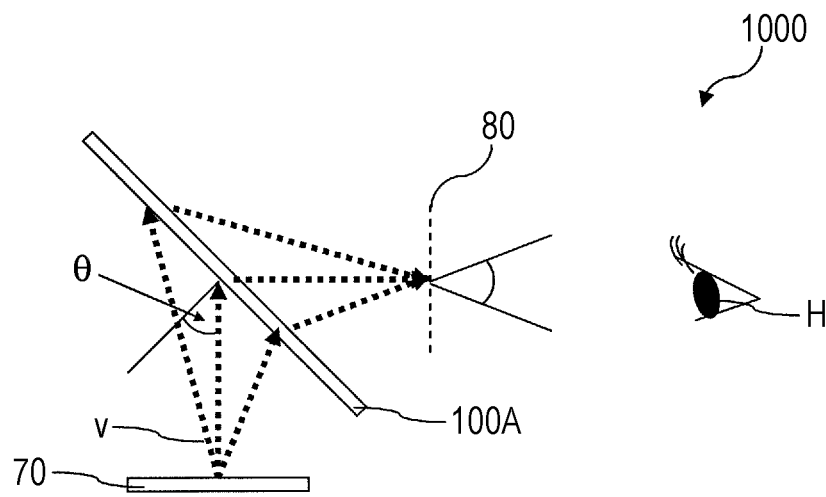
FIG. 4 is a schematic side view of an optical system 1000.

Next, descriptions are given to an optical system 1000 having the reflective imaging element 100A with reference to FIG. 4. FIG. 4 is a schematic side view of the optical system 1000. The reference character H in FIG. 4 denotes an observer, and θ is the incident angle illustrated in FIG. 3.

The optical system 1000 is an optical system that has the reflective imaging element 100A and the display panel 70 disposed on a light incident side of the reflective imaging element 100A and images a picture displayed on a display surface of the display panel 70 in a plane symmetric position with the reflective imaging element 100A as a plane of symmetry. The reflective element 10 described above (not shown in FIG. 4) is positioned on the display panel 70 side closer than the reflective elements 20 (not shown in FIG. 4), and the thickness of the reflective element 10 is greater than the thickness of the reflective elements 20. As described above, each of the reflective elements 10 through 50 are disposed in such a manner that the thicknesses of the reflective elements 10 through 50 become thicker as getting closer to the display panel 70. The relationship between the incident angle θ when the ratio of amount of light becomes highest and the width a, the thickness b, and the refractive index n of each of the light-transmitting elements 15*a* through 15*d* satisfies Expression (1).

[Math 1]

$$\theta = \sin^{-1}\left[n\sin\left\{90 - \tan^{-1}\left(\frac{b}{\sqrt{2}\,a}\right)\right\}\right] \quad (1)$$

$$0° < \theta < 90°$$

In such optical system 1000, an aerial picture 80 with a wide viewing angle is obtained.

Figure 5:
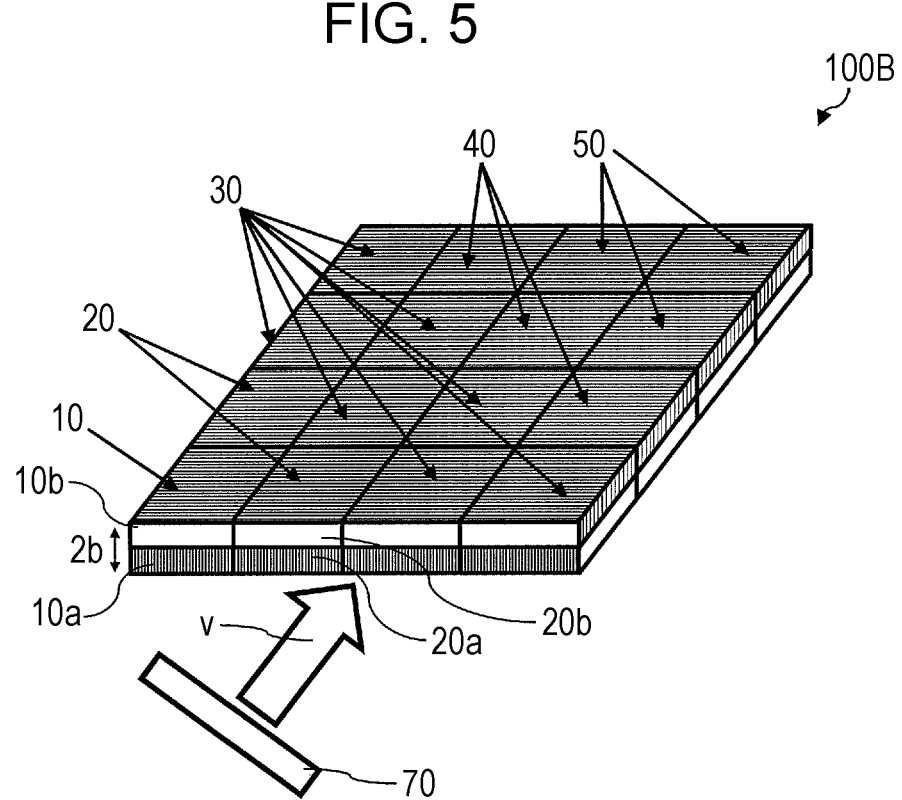
FIG. 5 is a schematic perspective view of a reflective imaging element 100B in another embodiment according to the present invention.

Next, with reference to FIG. 5, descriptions are given to a reflective imaging element 100B in another embodiment according to the present invention. FIG. 5 is a schematic perspective view of a reflective imaging element 100B. A same reference character is given to components in common with the reflective imaging element 100A to avoid repetitive descriptions.

The reflective imaging element 100B also has the reflective elements 10 through 50. However, different from the reflective imaging element 100A, the respective thickness of each of the reflective elements 10 through 50 is same, and further, the respective refractive indices of at least either one of the plurality of first light-transmitting elements 15*a* and the plurality of second light-transmitting elements 15*b* are different from respective refractive indices of at least either one of the plurality of third light-transmitting elements 15*c* and the plurality of fourth light-transmitting elements 15*d*. It is more preferred that the respective refractive indices of the plurality of first light-transmitting elements 15*a* and the plurality of second light-transmitting elements 15*b* are different from the respective refractive indices of the plurality of third light-transmitting elements 15*c* and the plurality of fourth light-transmitting elements 15*d*.

In the reflective imaging element 100B, the refractive indices of the plurality of first light-transmitting elements 15*a* and the plurality of second light-transmitting elements 15*b* are, for example, 1.7, respectively, and the refractive indices of the plurality of third light-transmitting elements 15*c* and the plurality of fourth light-transmitting elements 15*d* are, for example, 1.6, respectively. Further, in the reflective imaging element 100B, the refractive indices of all light-transmitting elements that the reflective elements 30 have are, for example, 1.5, and the refractive indices of all light-transmitting elements that the reflective elements 40 have are, for example, 1.4, and the refractive indices of all light-transmitting elements that the reflective elements 50 have are, for example, 1.3. That is, in the order of the reflective element 10, the reflective elements 20, the reflective elements 30, the reflective elements 40, and the reflective elements 50, the refractive indices of all light-transmitting elements that the reflective elements 10 through 50 decrease, respectively. In the reflective imaging element 100B, as the reflective imaging element 100A, the thickness of each of reflective elements 10 through 50 may also be different from each other.

Also in an optical system 1000 using the reflective imaging element 100B instead of the reflective imaging element 100A, an aerial picture with a wide viewing angle is obtained as illustrated in the graph illustrated in FIG. 3(*a*). At this time, it is preferred that the reflective element 10 of the reflective imaging element 100B is positioned on the display panel 70 side closer than the reflective elements 20.

The reflective elements 10 through 50 are disposed on the display panel 70 side so as to position in the order of the reflective element 10, the reflective elements 20, the reflective elements 30, the reflective elements 40, and the reflective elements 50. That is, the reflective element 10 is in a position closest to the display panel 70, and the reflective elements 50 is in a position most distant from the display panel 70.

Figure 6:
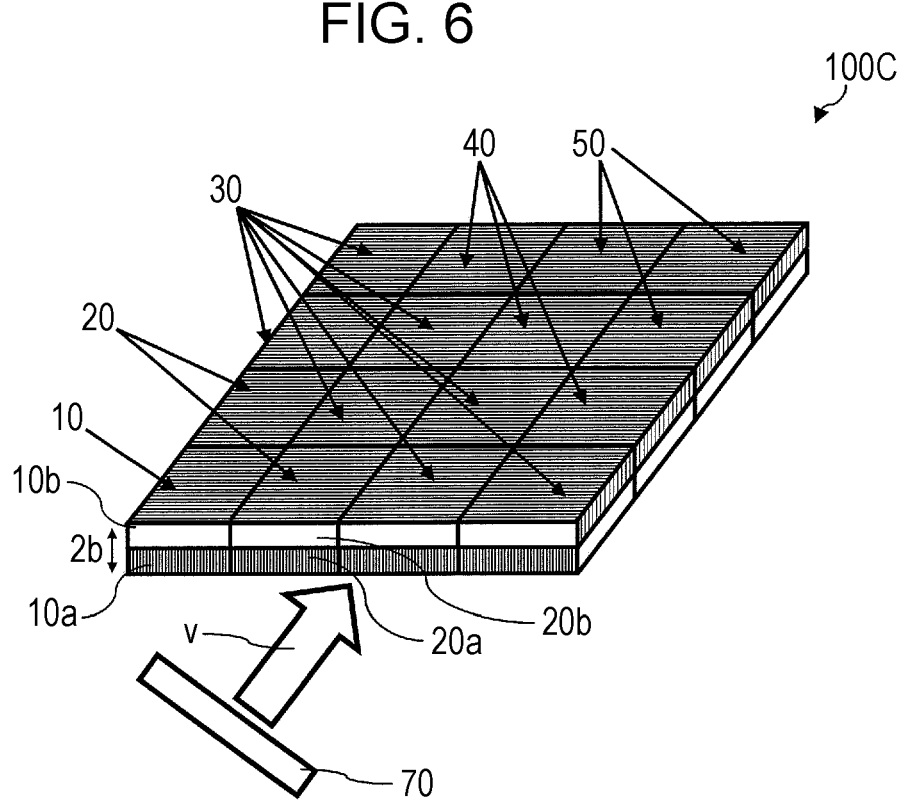
FIG. 6 is a schematic perspective view of a reflective imaging element 100C in still another embodiment according to the present invention.
Figure 7:
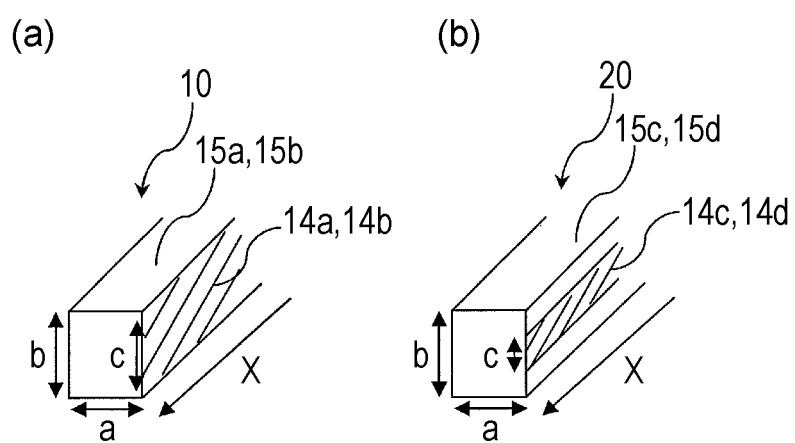
FIG. 7(a) is a schematic perspective view illustrating mirror elements 14a and 14b.
FIG. 7(b) is a schematic perspective view illustrating mirror elements 14c and 14d.
Figure 8:
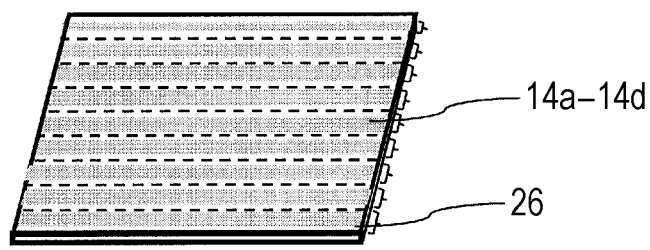
FIGS. 8(a) through 8(c) are schematic perspective views illustrating a method of manufacturing a unit imaging element 25 of the reflective imaging element 100C.
Figure 8:
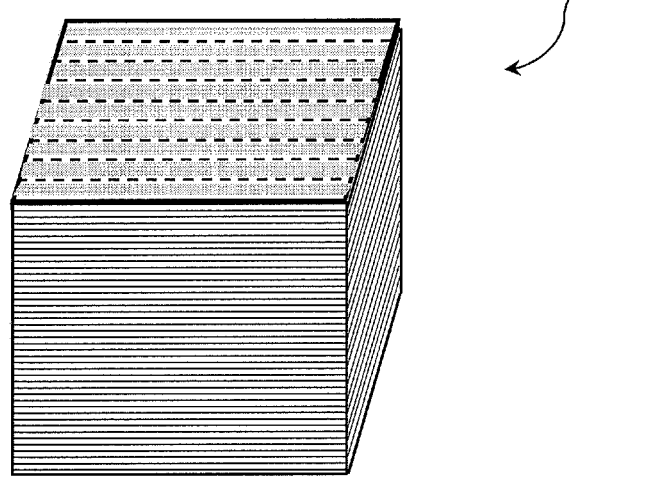
Figure 8:
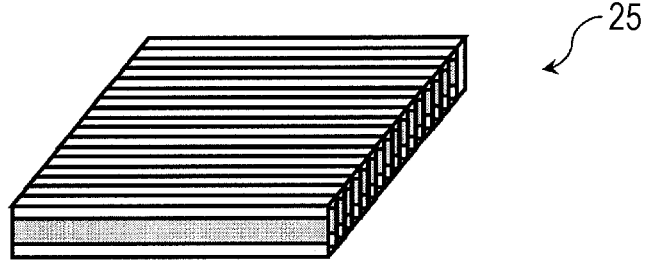

Next, with reference to FIG. 6 through FIG. 8, descriptions are given to a reflective imaging element 100C in still another embodiment according to the present invention. FIG. 6 is a schematic perspective view of the reflective imaging element 100C. FIG. 7(*a*) is a schematic perspective views to illustrate the mirror elements 14*a* and 14*b* that the reflective element 10 has, and FIG. 7(*b*) is a schematic perspective views to illustrate the mirror elements 14*c* and 14*d* that the reflective elements 20 have. A same reference character is given to components in common with the reflective imaging element 100A to avoid repetitive descriptions.

The reflective imaging element 100C also has the reflective elements 10 through 50. However, different from the reflective imaging element 100A, a thickness of each of reflective elements 10 through 50 is same, respectively. Further, at least either one of respective lengths c of the plurality of first mirror elements 14*a* in a thickness direction of the first unit reflective element 10*a* and respective lengths c of the plurality of second mirror elements 14*b* in a thickness direction of a second unit reflective element 10*b* is different from at least either one of respective lengths c of the plurality of third mirror elements 14*c* in a thickness direction of a third unit reflective element 20*a* and respective lengths c of the plurality of fourth mirror elements 14*d* in a thickness direction of the fourth unit reflective element 20*b*. It is more preferred that the respective lengths c of the plurality of first mirror elements 14*a* in the thickness direction of the first unit reflective element 10*a* and the respective lengths c of the plurality of second mirror elements 14*b* in the thickness direction of the second unit reflective element 10*b* are different from the respective lengths c of the plurality of third mirror elements 14*c* in the thickness direction of the third unit reflective element 20*a* and the respective lengths c of the plurality of fourth mirror elements 14*d* in the thickness direction of the fourth unit reflective element 20*b*.

In the reflective imaging element 100C, respective lengths c of the plurality of first mirror elements 14*a* in a thickness direction of the first unit reflective element 10*a* and respective lengths c of the plurality of second mirror elements 14*b* in a thickness direction of the second unit reflective element 10*b* are, for example, 1100 μm. Respective lengths c of the plurality of third mirror elements 14*c* in a thickness direction of the third unit reflective element 20*a* and respective lengths c of the plurality of fourth mirror elements 14*d* in a thickness direction of the fourth unit reflective element 20*b* are, for example, 1000 μm. Further, in the reflective imaging element 100C, respective lengths c of the plurality of mirror elements in a thickness direction of the unit reflective elements that the reflective elements 30 have are, for example, 900 μm, respective lengths c of the plurality of mirror elements in a thickness direction of the unit reflective elements that the reflective elements 40 have are, for example, 800 μm, and respective lengths c of the plurality of mirror elements in a thickness direction of the unit reflective elements that the reflective elements 50 have are, for example, 700 μm. In the reflective imaging element 100C, the thickness of each of the reflective elements 10 through 50 may be different from each other as the reflective imaging element 100A, the refractive indices of the light-transmitting elements that each of the reflective elements 10 through 50 has may be different as the reflective imaging element 100B, and they may also be combined.

Also in the optical system 1000 using the reflective imaging element 100C instead of the reflective imaging element 100A, an aerial picture with a wide viewing angle as the graph illustrated in FIG. 3 is obtained. At this time, it is preferred that the reflective element 10 of the reflective imaging element 100B is positioned on the display panel 70 side closer than the reflective elements 20. The reflective elements 10 through 50 are disposed so as to be positioned on the display panel 70 side in the order of the reflective element 10, the reflective elements 20, the reflective elements 30, the reflective elements 40, and the reflective elements 50. That is, the reflective element 10 is in a position closest to the display panel 70, and the reflective elements 50 are in a position most distant from the display panel 70. When using the reflective imaging element 100C, relationship between an incident angle θ when the ratio of amount of light becomes highest and the width a and the refractive index n of each of the light-transmitting elements 15a through 15d, and the lengths c of the mirror elements 14a through 14d (refer to FIG. 7(a) and FIG. 7(b)) satisfies Expression (2).

[Math 2]

$$\theta = \sin^{-1}\left[n\sin\left\{90 - \tan^{-1}\left(\frac{c}{\sqrt{2}\,a}\right)\right\}\right] \quad (2)$$

$$0° < \theta < 90°$$

Next, with reference to FIG. 8, descriptions are given to a method of manufacturing a unit reflective element that the reflective imaging element 100C has. FIG. 8(a) through 8(c) are schematic perspective views illustrating a method of manufacturing a unit reflective element. A same reference character is given to components in common with the reflective imaging element 100A to avoid repetitive descriptions.

As illustrated in FIG. 8(a), on the light-transmitting substrate (for example, a glass substrate) 26, a metal thin film (for example, an aluminum thin film) to be the mirror elements 14a through 14d described above is formed by, for example, sputtering or the like. After that, the metal thin film is patterned in, for example, a rectangular shape using photolithography or the like. The shape of the patterned metal thin film is not limited to rectangular and may also be trapezoidal or in a shape other than that. By patterning the metal thin film, the mirror elements 14a through 14d in stripes having a desired width are formed. With the substrate 26 having such mirror elements 14a through 14d in stripes formed thereon, layers of the substrates 26 are stacked so as to sandwich the mirror elements 14a through 14d in stripes between the light-transmitting substrates 26 to form the laminated structure 56 as illustrated in FIG. 8(b).

Next as illustrated in FIG. 8(c), the laminated structure 56 is cut using a wire saw or the like along a broken line illustrated in FIG. 8(c) to form the unit reflective element 25. The thickness b of the unit reflective element 25 is determined by the manner of cutting at this time, and the unit reflective element 25 having a desired thickness is easily obtained.

The reflective imaging element 100C is obtained by combining the unit reflective elements 25 having lengths c of the mirror elements 14a through 14d different from each other. Accordingly, not having to cut in a wedge shape as the reflective imaging element disclosed in PTL 3, the reflective imaging element 100C may be manufactured in a convenient method.

As above, a reflective optical element according to embodiments of the present invention may be manufactured in a convenient method, and an aerial picture with a wide viewing angle is obtained in an optical system using the same.

INDUSTRIAL APPLICABILITY

The present invention is widely applicable to a reflective imaging element capable of imaging an image of a projected material in a space and to an optical system having a display panel.

REFERENCE SIGNS LIST 2 light receiving surface
4 emitting surface
10, 20, 30, 40, 50 reflective element
10a, 10b, 20a, 20b, 25 unit reflective element
14a, 14b, 14c, 14d mirror element
15a, 15b, 15c, 15d light-transmitting element
70 projected material (display panel)
100A reflective imaging element
v light
a, X width
2b thickness
L1, L2 direction

The invention claimed is:
1. A reflective imaging element comprising:
a plurality of reflective elements arranged in a matrix, the plurality of reflective elements including a first reflective element and a second reflective element, the first reflective element and the second reflective element including a light receiving surface to receive light from an object and an emitting surface, parallel to the light receiving surface, to emit the light from the object, and the first reflective element being positioned closer to the object than the second reflective element; wherein
the first reflective element is configured to image the light from the object in a plane symmetric position with the first reflective element as a first plane of symmetry;
the first reflective element includes a first unit reflective element and a second unit reflective element disposed on the first unit reflective element; wherein
the first unit reflective element includes a plurality of first mirror elements and a plurality of first light-transmitting elements, each of the plurality of first light-transmitting elements is equipped between two adjacent first mirror elements out of the plurality of first mirror elements, and the plurality of first mirror elements and the plurality of first light-transmitting elements extend in a first direction,
the second unit reflective element includes a plurality of second mirror elements and a plurality of second light-transmitting elements, each of the plurality of second light-transmitting elements is equipped between two adjacent second mirror elements out of the plurality of second mirror elements, and the plurality of second mirror elements and the plurality of second light- transmitting elements extend in a second direction perpendicular to the first direction;

the second reflective element is configured to image the light from the object in a plane symmetric position with the second reflective element as a second plane of symmetry;

the second reflective element includes a third unit reflective element and a fourth unit reflective element disposed on the third unit reflective element; wherein the third unit reflective element includes a plurality of third mirror elements and a plurality of third light-transmitting elements, each of the plurality of third light-transmitting elements is equipped between two adjacent third mirror elements out of the plurality of third mirror elements, and the plurality of third mirror elements and the plurality of third light-transmitting elements extend in the first direction, and the fourth unit reflective element includes a plurality of fourth mirror elements and a plurality of fourth light-transmitting elements, each of the plurality of fourth light-transmitting elements is equipped between two adjacent fourth mirror elements out of the plurality of fourth mirror elements, and the plurality of fourth mirror elements and the plurality of fourth light-transmitting elements extend in the second direction;

the first plane of symmetry and the second plane of symmetry exist in a same plane;

when a ratio of light contributing to imaging out of the light from the object is defined as a ratio of amount of light and an incident angle of the light from the object when the ratio of amount of light is highest to the light receiving surface is defined as a maximum incident angle, the maximum incident angle of the first reflective element and the maximum incident angle of the second reflective element are different from each other;

a thickness of the first reflective element is the same as a thickness of the second reflective element; and at least either one of respective lengths of the plurality of first mirror elements in a thickness direction of the first unit reflective element and respective lengths of the plurality of second mirror elements in a thickness direction of the second unit reflective element are different from at least either one of respective lengths of the plurality of third mirror elements in a thickness direction of the third unit reflective element and respective lengths of the plurality of fourth mirror elements in a thickness direction of the fourth unit reflective element.

2. The reflective imaging element according to claim 1, wherein respective refractive indices of at least either one of the plurality of first light-transmitting elements and the plurality of second light-transmitting elements are different from respective refractive indices of at least either one of the plurality of third light-transmitting elements and the plurality of fourth light-transmitting elements.

3. An optical system comprising the reflective imaging element according to claim 2, and a display panel that is disposed on a light incident side of the reflective imaging element as the object, the optical system imaging a picture displayed on a display surface of the display panel in a plane symmetric position with the reflective imaging element as a plane of symmetry, wherein the first reflective element is positioned on a side of the display panel closer than the second reflective element, and respective refractive indices of at least either one of the plurality of first light-transmitting elements and the plurality of second light-transmitting elements are greater than respective refractive indices of at least either one of the plurality of third light-transmitting elements and the plurality of fourth light-transmitting elements.

4. An optical system comprising the reflective imaging element according to claim 1, and a display panel that is disposed on a light incident side of the reflective imaging element as the object, the optical system imaging a picture displayed on a display surface of the display panel in a plane symmetric position with the reflective imaging element as a plane of symmetry, wherein the first reflective element is positioned on a side of the display panel closer than the second reflective element.

5. The optical system according to claim 4, wherein respective refractive indices of at least either one of the plurality of first light-transmitting elements and the plurality of second light-transmitting elements are greater than respective refractive indices of at least either one of the plurality of third light-transmitting elements and the plurality of fourth light-transmitting elements.

6. The optical system according to claim 4, wherein at least either one of respective lengths of the plurality of first mirror elements in a thickness direction of the first unit reflective element and respective lengths of the plurality of second mirror elements in a thickness direction of the second unit reflective element is greater than at least either one of respective lengths of the plurality of third mirror elements in a thickness direction of the third unit reflective element and respective lengths of the plurality of fourth mirror elements in a thickness direction of the fourth unit reflective element.

* * * * *